US012777040B2

(12) United States Patent
Boucadair et al.

(10) Patent No.: US 12,777,040 B2
(45) Date of Patent: Oct. 27, 2026

(54) CONTROL AND TRANSMISSION METHODS, AND ENTITIES CONFIGURED TO IMPLEMENT THESE METHODS

(71) Applicant: ORANGE, Issy-les-Moulineaux (FR)

(72) Inventors: Mohamed Boucadair, Chatillon Cedex (FR); Christian Jacquenet, Chatillon Cedex (FR)

(73) Assignee: ORANGE, Issy-les-Moulineaux (FR)

( * ) Notice: Subject to any disclaimer, the term of this patent is extended or adjusted under 35 U.S.C. 154(b) by 49 days.

(21) Appl. No.: 18/708,760

(22) PCT Filed: Nov. 8, 2022

(86) PCT No.: PCT/EP2022/081048
§ 371 (c)(1),
(2) Date: May 9, 2024

(87) PCT Pub. No.: WO2023/083772
PCT Pub. Date: May 19, 2023

(65) Prior Publication Data

US 2025/0007915 A1 Jan. 2, 2025

(30) Foreign Application Priority Data

Nov. 10, 2021 (FR) ...................................... 2111975

(51) Int. Cl.
*H04L 9/40* (2022.01)
*H04L 61/4511* (2022.01)

(52) U.S. Cl.
CPC .......... *H04L 63/10* (2013.01); *H04L 61/4511* (2022.05)

(58) Field of Classification Search
None
See application file for complete search history.

(56) References Cited

U.S. PATENT DOCUMENTS

| | | | | |
|---|---|---|---|---|
| 11,329,946 | B2 * | 5/2022 | Dupont | H04L 61/58 |
| 12,010,090 | B2 * | 6/2024 | Anderson | H04L 61/4511 |
| 2015/0271031 | A1 * | 9/2015 | Beevers | G06F 16/29<br>709/224 |
| 2017/0264590 | A1 * | 9/2017 | Xing | H04L 63/1483 |
| 2019/0166210 | A1 * | 5/2019 | Froger | H04L 67/1021 |

OTHER PUBLICATIONS

English translation of the Written Opinion of the International Searching Authority dated Feb. 9, 2023 for corresponding International Application No. PCT/EP2022/081048, filed Nov. 8, 2022.

(Continued)

*Primary Examiner* — Lashonda Jacobs-Burton
(74) *Attorney, Agent, or Firm* — David D. Brush; Westman, Champlin & Koehler, P.A.

(57) ABSTRACT

A method for controlling a client device to access a service via at least one network. The control method is implemented by a trusted entity for the service and/or the client device and includes: controlling a configuration of the client device, during access by the latter to the service, in order for it to transmit, to at least one device designated for the service and authorised by the trusted entity, at least one domain name resolution request emitted by the client device within the context of the service.

15 Claims, 3 Drawing Sheets

(56) References Cited

OTHER PUBLICATIONS

Y. Cheng et al., “TCP Fast Open,” Internet Engineering Task Force (IETF) RFC 7413, ISSN: 2070-1721, Dec. 2014.
E. Rescorla et al., “The Transport Layer Security (TLS) Protocol Version 1.3,” Internet Engineering Task Force (IETF) RFC 8446, ISSN: 2070-1721, Aug. 2018.
M.S. Lenders et al., “DNS Queries over CoAP (DOC),” Internet-Draft: draft-lenders-dns-over-coap-01, Memo, Sep. 1, 2021.
International Search Report dated Feb. 9, 2023 for corresponding International Application No. PCT/EP2022/081048, filed Nov. 8, 2022.
Written Opinion of the International Searching Authority dated Feb. 9, 2023 for corresponding International Application No. PCT/EP2022/081048, filed Nov. 8, 2022.

* cited by examiner

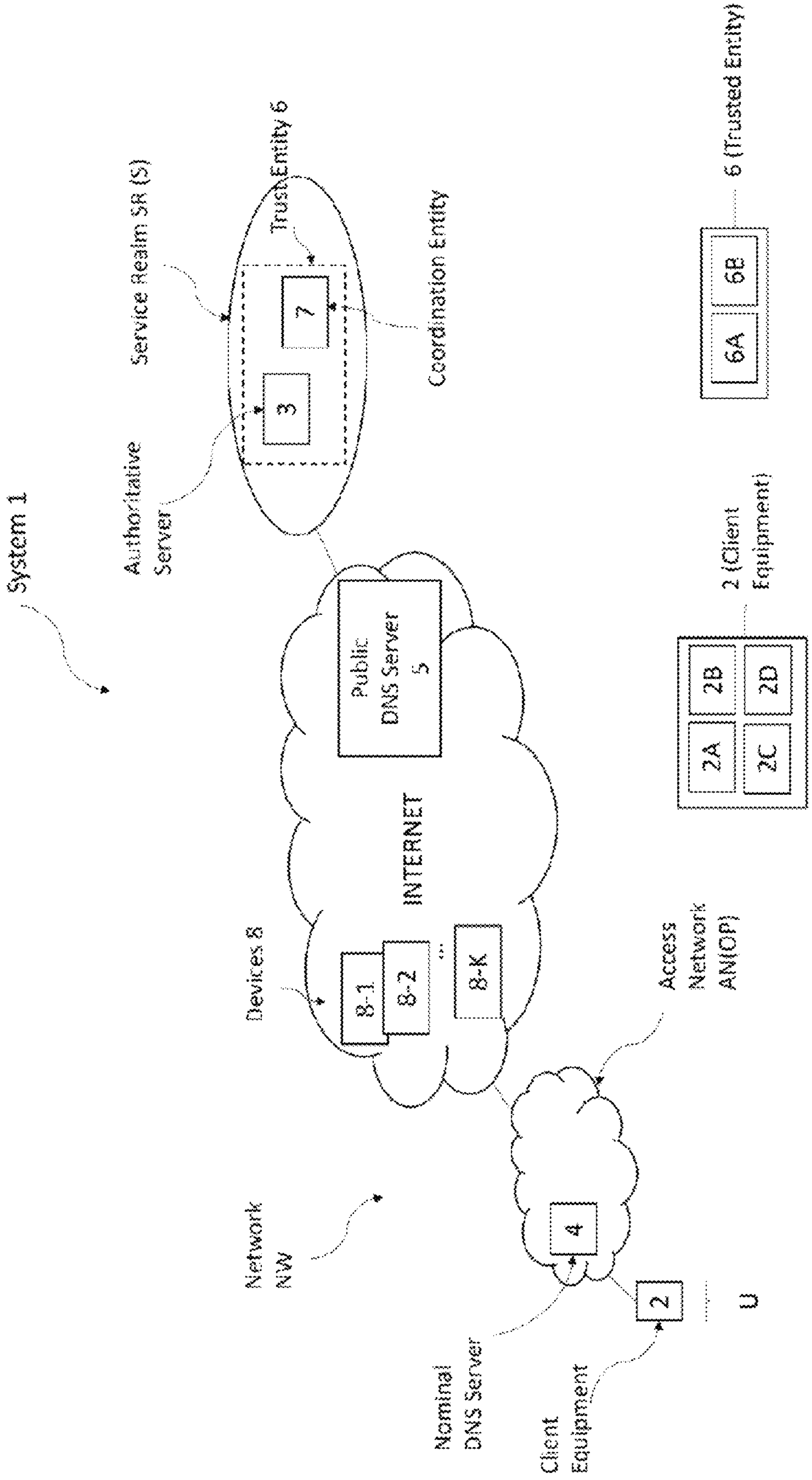
[Fig. 1]

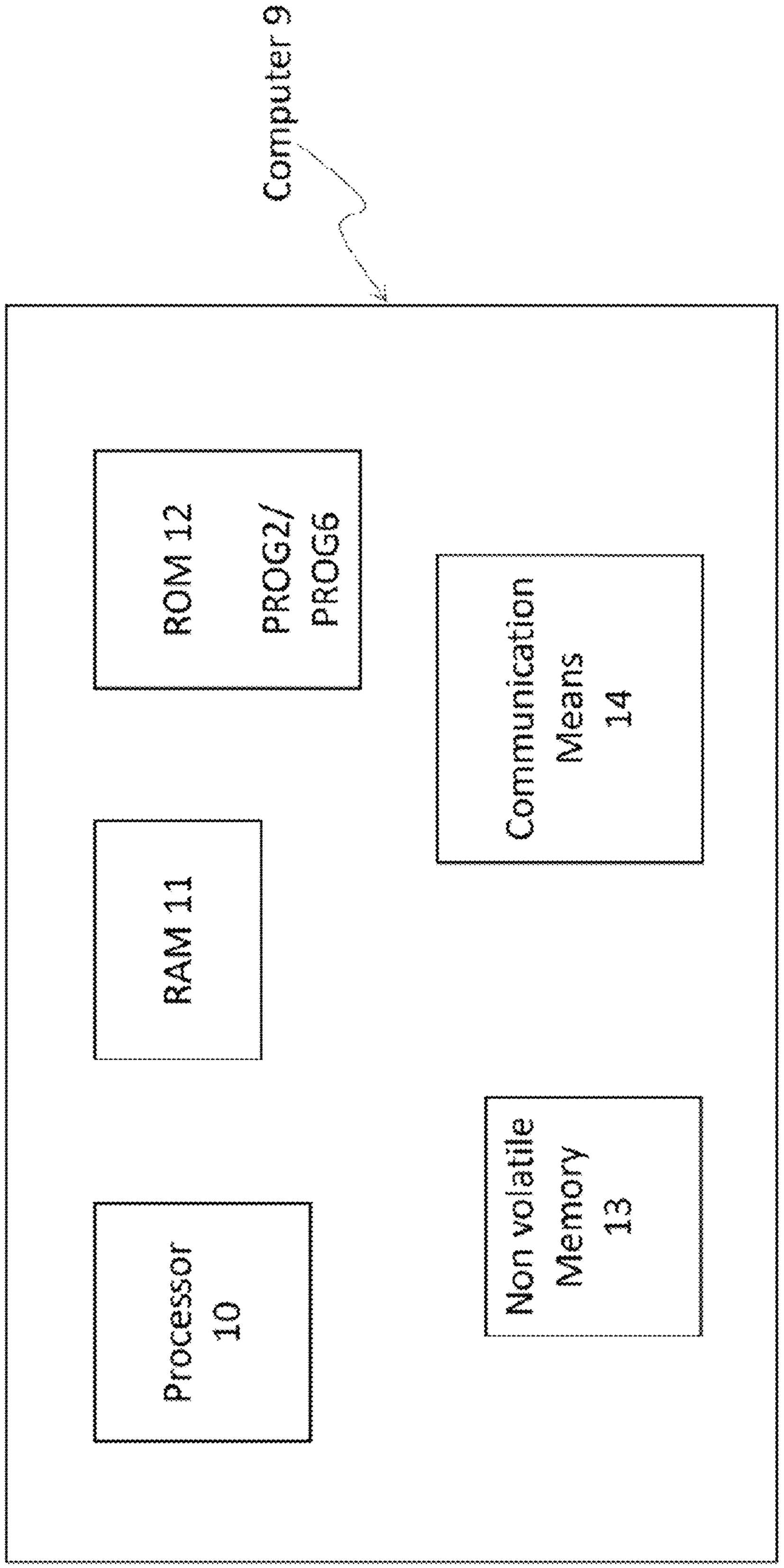
[Fig. 2]

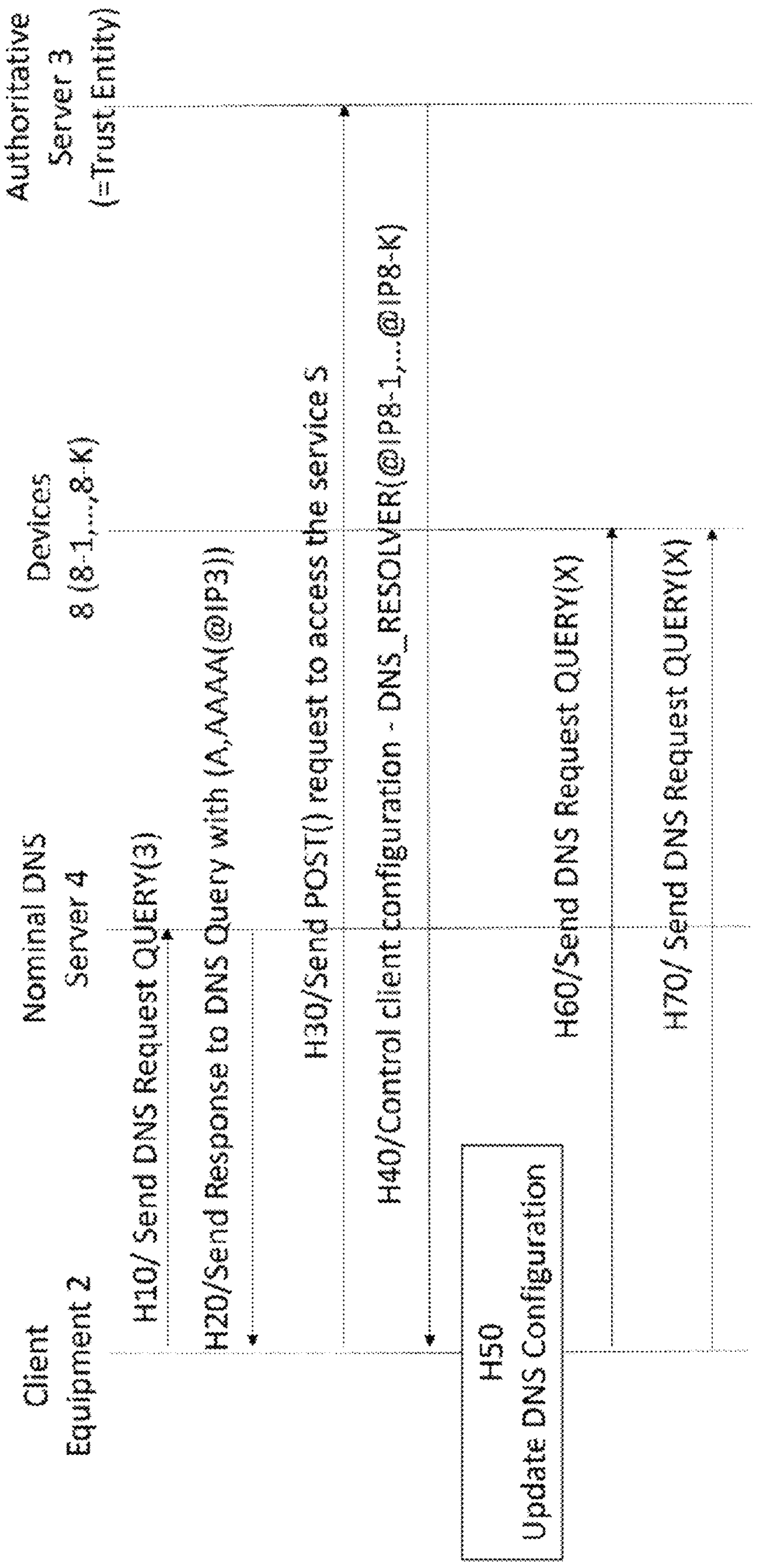
[Fig. 3]

CONTROL AND TRANSMISSION METHODS, AND ENTITIES CONFIGURED TO IMPLEMENT THESE METHODS

CROSS-REFERENCE TO RELATED APPLICATIONS

This Application is a Section 371 National Stage Application of International Application No. PCT/EP2022/081048, filed Nov. 8, 2022, and published as WO 2023/083772 A1 on May 19, 2023, not in English, which claims priority to French Patent Application No. 2111975, filed Nov. 10, 2021, the contents of which are hereby incorporated by references in their entireties.

PRIOR ART

The invention falls within the general field of telecommunications.

It relates more particularly to the domain name resolution systems or DNS («Domain Name System»).

As is known, a DNS system is a fundamental component in the IP («Internet Protocol») communication networks. It makes it possible to associate with a resource such as a domain name, an identifier of URI («Uniform Resource Identifier») type, one or more IP addresses allowing access to this resource.

Thus, when a client equipment, such as for example a terminal or an application, wants to set up, to access any service, a communication with a server identified by a fully qualified domain name (or FQDN), such as «www.example-.com», the DNS client embedded in the client equipment concerned sends a DNS resolution request to a DNS server to retrieve the IP address or addresses associated with this domain name. The DNS server can then respond with a list of IP addresses if an entry which corresponds to this domain name is locally available, or relay the request from the communicating entity to another DNS server (recursive DNS server) according to the known DNS hierarchy if it does not have such an entry, etc.

In the current state-of-the-art, the DNS service, and more particularly the DNS server to be used for the resolution of domain names, is generally configured at the client equipment by the operator which provides it with IP connectivity (e.g. access network or IP service operator). This configuration takes place prior to any communication from the client equipment, typically when it is connected or attached to the network of the operator concerned or via a factory configuration.

Some users replace this nominal DNS configuration supplied by their operator with alternative DNS servers. These servers (designated «alternative servers» hereinafter in the description) are generally public DNS servers, offered by third-party operators, and displaying faster response times than certain nominal DNS servers supplied by the operators, and/or offering more advanced security functions.

Regardless of the DNS configuration retained (that is to say nominal server supplied by the IP connectivity operator, or public or private alternative server), it applies equally to all the services that the client equipment can access. The service providers are therefore dependent on the performance levels of this DNS configuration for the rendering of the services that they offer to the users, and therefore do not control the overall quality of experience perceived by the users. Indeed, if the underlying DNS service offered by the nominal DNS server supplied by the operator or the alternative DNS server selected by the user is not optimal, a degradation of the service may follow therefrom.

SUMMARY OF THE INVENTION

The invention improves this situation by proposing, according to a first aspect, a method for controlling a client equipment to access a service via a network, this control method being intended to be implemented by a trusted entity for the service and/or the client equipment and comprising a step of controlling a configuration of said client equipment, when the latter accesses said service, for it to transmit to at least one device designated for the service and authorized by the trusted entity, at least one domain name resolution request sent by the client equipment in the context of the service.

By correlation, the invention also targets a trusted entity for a service and/or a client equipment of a network, this trusted entity comprising a control module, configured to control a configuration of the client equipment during an access to the service, for it to transmit to at least one device designated for the service and authorized by the trusted entity, at least one domain name resolution request sent by the client equipment in the context of the service.

This trusted entity is for example a server involved directly or indirectly in the provision of the service, such as, for example, an «authoritative server» invoked by the client equipment for the provision of the service.

According to another example, it can be an intermediate entity placed on a communication path taken when the service is accessed by the client equipment. Such an intermediate entity can notably be a proxy (or relay).

It is important for it to be a trusted entity for the client equipment and/or for the service (and therefore, incidentally, for the provider of the service concerned) to avoid having this entity be used to divert the data transmitted by the client equipment.

The invention therefore proposes dynamically controlling, by a trusted entity for the service and/or for the client equipment, the DNS configuration of the latter in order to correlate it with the service to which it allows access. In other words, the trusted entity replaces the nominal DNS server or the alternative DNS server configured by default in the client equipment by a device that it has designated to resolve the DNS requests sent by the client equipment in the context of a service. This control makes it possible to customize the DNS service used when accessing the service (that is to say when the client equipment consumes the service concerned), to optimize it for this service, and to thus improve the quality of experience perceived by the user. The DNS service thus controlled is advantageously adapted to the service: it can notably be adapted to service constraints, offer advanced functions relying on the DNS service benefiting the user and the service, or even be configured for all or part of the (service) connections set up from the client equipment to be the subject of particular processing operations. It can also be adapted to the client equipment, and differ from one client equipment to another. By controlling the device (hereinafter designated for simplicity as «DNS device») responsible for resolving the domain name resolution requests sent by a client equipment in the context of its access to a service, it is possible to control the equipments through which the connections set up by the client equipment transit in the context of the service, and therefore, incidentally, the processing operations applied to these connections.

Moreover, in some situations, the client equipment can be configured with client identity preservation policies (for example, reduction to the minimum of the volume of identification data shared with the services, location or network attachment emulation). When applied in such a context, the invention makes it possible to ensure that the client equipment uses DNS information returned by a trusted entity which keeps a list of DNS servers for each service. This list can be supplemented with measurements of quality of service and as a function of the location of the client equipment. The trusted entity selects, for the client equipment, the DNS server or servers when accessing the service to control the identification information and/or improve the quality of service.

It should be noted that the expression «when the service is accessed by the client equipment» should be understood to mean generally «at any moment», given that the client equipment invokes/consumes the service concerned. Thus, the modification of the DNS configuration of the client equipment into a DNS configuration adapted to the service is implemented upon the setting up of the connection allowing access to the service, also designated hereinafter as underlying connection to the service (for example in response to a request to set up such an underlying connection to the service sent by the client equipment even before useful data are exchanged in the context of this service, such as in a 3WHS TCP (for «3-way handshake Transmission Control Protocol») exchange). However, it can also take place subsequently, as long as the client equipment accesses the service concerned.

The invention notably allows for a better distribution of the DNS traffic sent by the client equipments; a concentration of the DNS requests to a single DNS server is thus avoided, which makes it possible to reduce the traceability of the users on the basis of their DNS requests (also known as «DNS profiling»).

Furthermore, by, if necessary, having a control on the DNS configuration of the client equipment, the service provider has an overall control on the provision of its service and can thus exercise its responsibility in the case of degradation of this service (e.g. degraded access times to the service).

As mentioned above, the control of the DNS configuration as a function of the service as proposed by the invention can be exploited to implement new functions in the network linked with the service.

Indeed, the DNS device can adapt its responses to the DNS requests from the client equipment so as to be on the path of all the connections set up by the client equipment when accessing the service, namely not only the main connection set up by the user equipment with the infrastructure offering the service, but also all the secondary connections set up at the margin of this main connection, such as for example with «tracking servers», etc. By virtue of this privileged position, the DNS device is able to analyze the data packets sent over all of these connections and track or detect determined events likely to affect the private nature of the data transmitted in these packets, such as, for example, the transport by these packets of client equipment user identification information. It can also designate another equipment responsible for analyzing the data transported in the packets sent by the client equipment of the user.

The invention also offers the possibility of more easily and immediately attaching to the DNS device new advanced functions that are advantageous for the implementation of the service. Generally, the deployment of such functions requires the involvement of several actors, which makes this deployment complicated. For example, the definition of a new type of record or RR (for «Resource Record») is not generally recommended because that presupposes the updating of an ecosystem managed by several distinct entities including the DNS clients, the DNS servers and the DNS relays responsible for the routing of the DNS requests (or «forwarders»), the caches, etc., as well as the coordination between these entities in order to make the information maintained by each of them reliable. The invention allows a service provider to deploy new functions in the context of this service without being dependent on these other actors and allows the client equipment to benefit from such functions.

The DNS device designated by the trusted entity can also be advantageously configured with «private» domain names, specific to the implementation of the service and that the service provider does not want communicated to a public DNS server or to a nominal DNS server provided by the operator of the network (context of a service relying on connected things for example). Such a public or nominal DNS server will then return a negative response if it is solicited to resolve such a private domain name. The fact of not communicating these private domain names constitutes a security measure making it possible to minimize the risk of potential denial-of-service attacks targeting these domain names.

That also allows the service provider to generate, in the context of its service, ephemeral and personalized domain names, for example based on the identity of the user of the client equipment. The invention offers a certain flexibility in terms of introduction or removal of domain names in the DNS chain, which is not the case with a public or nominal DNS server.

Thus, in light of the above, the invention makes it possible to manage several types of domain name resolution requests and in particular requests concerning:

- a private domain name; and/or
- a domain name generated in the context of the service for the client equipment; and/or
- an ephemeral domain name.

It is also possible to configure the DNS device designated by the trusted entity for it to return personalized responses to the client equipment when it is solicited for the resolution of domain names, making it possible for example to satisfy service constraints. Such a personalized response can notably consist in the sending of one or more IP addresses situated in proximity to the client equipment (also called «Geoproximity IP»).

In a particular embodiment, the step of configuration of the client equipment comprises a transmission by the trusted entity to the client equipment of a message comprising at least one reachability information item of at least one said device designated for the service and authorized by the trusted entity.

There is no limitation as to the nature of the reachability information communicated. It can notably be an IP address, a domain name, an alias, an authentication identifier, etc.

This facilitates the implementation of the invention and allows for an immediate execution of the new DNS configuration, upon reception of the message. Furthermore, the quantity of information conveyed in the message to configure the client equipment is advantageously reduced.

It should be noted that the message concerned can be encrypted or not. The encryption of the message makes it possible to avoid the hacking of the connections by a third-party entity, and such an encryption is preferable in the case of a trusted entity for the service. However, the securing of the exchanges between the trusted entity and the client equipment can be ensured by other mechanisms (for example for a trusted entity for the client configured using suitable ACL (for «Access Control Lists») rules).

This embodiment also offers the advantage of separating the service logic from the DNS logic, and allows for a better stability of the service and of the DNS mechanism: the personalization of the DNS service is performed by the device designated by the trusted entity and not by the infrastructure (e.g. authoritative server) providing the service.

For example, the message concerned can be a response message to a service invocation message sent by the client equipment. Such an invocation message is for example a TCP 3WHS message as explained previously, or a ClientHello TLS (for «Transport Layer Security») message or even a QUIC Handshake message, all messages that are known per se. This is transparent for the user and makes it possible to save on the signaling (and the bandwidth) required to implement the invention. As a variant, the message concerned can be a message sent asynchronously by the trusted entity.

In a particular embodiment, said at least one reachability information item is included in a header, an option, a frame (for example a QUIC frame), an attribute (for example an SDP (Session Description Protocol) attribute), a payload (or «message body» with a predefined structure), etc.

For example, in the context of a message according to the HTTP (HyperText Transfer Protocol) protocol, it is possible to envisage the presence of a new header, illustratively called DNS_RESOLVER, valued with said at least one reachability information item and indicating to the client equipment that it should address its future DNS requests in the context of the service to said at least one equipment associated with said at least one reachability information item.

This variant is relatively simple to implement and is based on already existing messages. Only a header (or if necessary an option, a frame, an attribute or a payload having a predefined structure according to the variant envisaged) has to be newly introduced for the needs of the invention.

It should be noted that if the invention has a privileged application when any version of the HTTP protocol is used, it can also be used in association with other protocols, such as for example with the CoAP (Constrained Application Protocol) protocol through the definition of a new option dedicated to the invention, or with the QUIC protocol, through the definition of a new frame dedicated to the invention.

In another embodiment, the reachability information is sent in a dedicated response message whose structure is explicitly indicated by a new type of media (or «media type» such as «json+dns-resolver» for example). This media type indicates that the content of a message is of «JSON» type and transports a DNS server.

In another embodiment, the configuration of the client equipment can be implemented via the sending, by the trusted entity, of a list of domain names potentially involved in accessing the service by the client equipment, and of the IP addresses which are respectively associated with them, for example in a response to a service invocation message or to a DNS request. It should however be noted that this embodiment has an implication on the size of the messages sent to the client equipment, and can include, according to the transport protocol involved, a fragmentation.

The invention also offers the possibility of indicating to the client equipment a plurality of DNS devices (and notably of reachability information of these DNS devices), each DNS device being able to be associated with a context of use for the client equipment to be able to orient its DNS requests to the best suited DNS device as a function of its current context (e.g. as a function of its geographic location).

As a variant, the message transmitted by the trusted entity can comprise, for at least one said device designated for said service and authorized by said trusted entity, at least one information item characterizing at least one functional capability of said device.

Such a functional capability is for example a list of methods, and/or of records (RR), and/or of protocols supported by the device concerned.

That allows for a better distribution of the DNS requests sent by the client equipment. The DNS device is adapted to the context in which the client equipment solicits a resolution of domain names and can provide a detailed response to the client equipment.

According to a second aspect, the invention also targets a method for transmitting at least one domain name resolution request intended to be implemented by a client equipment in the context of a service provided via a network, this method comprising:

- a step of modification, when accessing the service and subject to a control from a trusted entity for the service and/or the client equipment, of a configuration of the client equipment for it to transmit to at least one device designated for a processing of the domain name resolution requests associated with the service and authorized by the trusted entity, at least one domain name resolution request sent by the client equipment in the context of the access to the service; and
- a step of transmission of at least one domain name resolution request in the context of the access to the service to at least one said designated device.

By correlation, the invention relates also to a client equipment of a network comprising:

- a modification module, configured to modify, during an access to a service provided via the network and subject to a control from a trusted entity for the service and/or the client equipment, a configuration of the client equipment for it to transmit to at least one device designated for a processing of the domain name resolution requests associated with the service and authorized by the trusted entity, at least one domain name resolution request sent by the client equipment in the context of the access to the service; and
- a transmission module, configured to transmit at least one domain name resolution request in the context of the access to the service to at least one said designated device.

In a particular embodiment, the client equipment further comprises an obtaining module, configured to obtain, for at least one said designated device, an information item characterizing at least one functional capability of this device, the transmission module being configured to transmit said at least one domain name resolution request to one said device selected as a function of said at least one functional capability of this device.

The transmission method and the client equipment benefit from the same advantages cited previously as the control method and the trusted entity.

In a particular embodiment, the control and transmission methods are implemented by a computer.

The invention also targets a computer program on a storage medium, this program being able to be implemented in a computer or more generally in a trusted entity conforming to the invention and comprises instructions suited to the implementation of a control method as described hereinabove.

The invention also targets a computer program on a storage medium, this program being able to be implemented in a computer or more generally in client equipment conforming to the invention and comprises instructions suited to the implementation of a transmission method as described hereinabove.

Each of these programs can use any programming language, and be in the form of source code, object code, or of intermediate code between source code and object code, such as in a partially compiled form, or in any other desirable form.

The invention also targets an information medium or a storage medium that can be read by a computer, and comprising instructions of a computer program as mentioned above.

The information or storage medium can be any entity or device capable of storing the programs. For example, the medium can comprise a storage means, such as a ROM, for example a CD ROM or a microelectronic circuit ROM, or even a magnetic storage means, for example a hard disk, or a flash memory.

Also, the information or storage medium can be a transmissible medium such as an electrical or optical signal, which can be conveyed via an electrical or optical cable, by radio link, by wireless optical link or by other means.

The program according to the invention can in particular be downloaded over a network of Internet type.

Alternatively, the information or storage medium can be an integrated circuit in which a program is incorporated, the circuit being adapted to execute or be used in the execution of the control or transmission methods according to the invention.

According to yet another aspect, the invention targets a system for accessing a service provided via a network comprising:

- a trusted entity according to the invention;
- a client equipment according to the invention; and
- at least one device designated for a processing of the domain name resolution requests associated with the service and authorized by the trusted entity with which the client equipment is configured by the trusted entity to transmit at least one domain name resolution request in the context of the access to the service.

In other embodiments, it is also possible to envisage the control and transmission methods, the trusted entity, the client equipment and the system according to the invention having, in combination, all or part of the above-mentioned features.

BRIEF DESCRIPTION OF THE DRAWINGS

Other features and advantages of the present invention will emerge from the description given hereinbelow, with reference to the attached drawings which illustrate an exemplary embodiment thereof without any limiting nature. In the figures:

FIG. 1 represents, in its environment, a system for accessing a service via a network conforming to the invention, in a particular embodiment;

FIG. 2 schematically represents the hardware architecture of a computer that can host any one of the entities according to the invention belonging to the system of FIG. 1; and FIG. 3 represents the main steps of a control method and of a transmission method according to the invention in a particular embodiment in which they are implemented by the entities of the system of FIG. 1.

DESCRIPTION OF THE INVENTION

FIG. 1 represents, in its environment, an access system 1 to a service S provided via a network NW, conforming to the invention, in a particular embodiment. It should be noted that the network NW can be composed of one or more (sub-)networks connected to one another.

In the example considered in FIG. 1, the service S is an application service proposed via the Internet network via a service provider SP to a client equipment 2 of a user U, conforming to the invention. There is no limitation as to the nature of the service S thus provided (e.g. web service, voice-over-IP service, WebRTC service, etc.), or to the nature of the client equipment 2 used to access it (e.g. smart phone, fixed or portable computer, digital tablet, etc.).

To provide the service S, the service provider SP relies on a service infrastructure hosted in a service domain, or «Service Realm», SR. For the purposes of simplification, it is considered here that the service realm SR comprises an «authoritative server» 3 with which, to access the service S, the user U sets up a so-called main connection (C1) via his or her client equipment 2. This hypothesis is not however limiting in itself, the invention applies equally when the service realm SR comprises a plurality of servers (e.g. authoritative server, cache servers, load distributors (or «load balancers»), etc.) hosted in a single structure (for example a «cloud computing» infrastructure) or a single equipment, or in several structures or several equipments. The service S can also be located in a network other than the Internet network, for example in a network of an operator or in a public infrastructure (e.g. «public cloud»).

In the example considered here, it is assumed that, to access the Internet network and the service S, the user equipment 2 is connected directly to a network of an operator, and more particularly to a cellular access network AN or PLMN (for «Public Land Mobile Network») administered by an operator OP. This assumption is not however limiting in itself, and as a variant, the user equipment 3 can be connected to the Internet network via a local area network (LAN) such as a domestic network, an enterprise network, etc., via a dedicated equipment designated CPE (for «Customer Premises Equipment»).

It is assumed here that, when the user equipment 2 connects to the network AN of the operator OP to benefit from a network connectivity, the operator OP configures the user equipment 2 with a reachability information item (e.g. IP address or addresses, domain name, alias, authentication identifier, etc.) of a so-called nominal DNS server 4 to be used to resolve its DNS requests, regardless of the service which the client equipment 2 wants to access. This reachability information item can possibly be modified by the user U, via a user interface provided for this purpose, to replace the nominal DNS server 4 with a public DNS server 5, accessible via the Internet network.

This DNS configuration of the client equipment 2 (whether with the nominal DNS server 4 or with the public DNS server 5) is performed independently of any access to a service by the client equipment 2, for example prior to any access to a service (notably for the configuration with the nominal DNS server 4), in other words before any invocation or consumption of the service by the client equipment 2, and applies here, once done, regardless of the service that the client equipment 2 accesses. That is here designated «nominal DNS configuration».

It should be noted that, in the interests of simplification, a single nominal DNS server 4 has been considered in the nominal DNS configuration. It is however possible to define, in this nominal DNS configuration, several DNS servers which can be selected as a function of the network interface used by the client equipment 2 to access a service.

As set out previously, the system 1 for accessing the service S makes it possible to control the DNS configuration of the client equipment 2 to adapt it to the service S. This control takes place when the client equipment 2 invokes the service S, as detailed further hereinbelow. To this end, the system 1 comprises, in addition to the client equipment 2, a trusted entity 6, conforming to the invention.

In the embodiment described here, the trusted entity 6 is an entity with which the provider SP of the service S has a trusted relationship. It can for example be an entity managed by the provider SP of the service S or an entity with which it has a security relationship. Such an entity is for example a service S coordination entity 7 located in the service realm SR, or even the authoritative server 3.

It is this trusted entity 6 which, in accordance with the invention, is able to authorize at least one device referenced generally by 8 (also sometimes designated «DNS device 8» hereinbelow), designated specifically for the service S, to resolve the DNS requests from the client equipment 2 and to control the DNS configuration of the client equipment 2 for it to address the DNS requests that it has in the context of the access to the service S to this or these DNS devices 8 for the resolution of the domain names targeted by these DNS requests. The way in which the DNS device or devices 8 are chosen is described in more detail later. They can differ from one client equipment to another. The DNS devices 8 belong, in accordance with the invention, to the system 1 for accessing the service S.

In the embodiment described here, the client equipment 2 and the trusted entity 6 for the service S have the hardware architecture of a computer 9 as illustrated in FIG. 2. It will be noted that, as a variant, the client equipment 2 and/or the trusted entity 6 can be software instances hosted by a physical equipment having the hardware architecture of the computer 9.

The computer 9 notably comprises a processor 10, a random-access memory 11, a read-only memory 12, a non-volatile memory 13, and communication means 14 notably allowing the entities of the system 1 to communicate with one another.

The read-only memory 12 of the computer 9 constitutes a storage medium conforming to the invention, readable by the processor 10, and on which is stored a computer program conforming to the invention.

More specifically, the read-only memory 12 of the computer 9 comprises, when the latter is or hosts a trusted entity 6 conforming to the invention, a record of a computer program PROG6, comprising instructions defining the main steps of a control method according to the invention.

This program PROG6 defines functional modules of the trusted entity 6 which rely on or control the hardware elements 10 to 14 of the computer 9 cited previously. These modules notably comprise, in the embodiment described here:

- an authorization module 6A, configured to authorize at least one DNS device 8 designated for the service S to resolve domain names which are addressed to it by the client equipment 2 in the context of the service S. Depending on the context of application of the invention, the DNS device or devices 8 concerned can have been chosen by the trusted entity 6 or by another entity, then validated and authorized by the trusted entity 6. There is no limitation as to the manner in which the authorization module 6A authorizes, or in an equivalent manner validates, the intervention of the DNS device or devices 8. For example, if the latter had been selected by another entity, this validation can result from the existence of a security or trust relationship with this other entity, or from the presence of this other entity in a list of entities authorized by the service provider S. It is also possible to envisage a secured exchange between the trusted entity 6 and the DNS devices 8 to verify that they are indeed authorized to act for the resolution of domain names in the context of the service S, or the presence of these DNS devices 8 in a list supplied by the service provider S, etc.; and
- a control module 6B, configured to control a DNS configuration of the client equipment 2 applied when the client equipment 2 accesses the service S, for it to transmit to at least one said DNS device 8 designated for the service S and authorized by the authorization module 6A of the trusted entity 6, at least one domain name resolution request sent by the client equipment 2 in the context of its access to the service S. The domain name resolution requests concerned are defined by selection rules supplied by the control module 6B to the client equipment 2. Such selection rules define the domain names associated with the service S affected by the configuration, such as, for example, all the «*.example.com» sub-domains or just a part of them (e.g. «*.piv.example.com»). Different ways for the control module 6B to control the DNS configuration of the client equipment 2 can be envisaged. For example, the control module 6B can control the DNS configuration of the client equipment 2 by sending it a message containing a specific header, for example a header named DNS_RESOLVER, this header containing a reachability information item (e.g. IP address, domain name, alias, authentication identifier, etc.) of said at least one DNS device 8 designated for the service S and indicating to the client equipment 2 that it should address its DNS requests to this or these DNS device or devices 8. This message can be sent asynchronously (spontaneously) by the control module 6B to the client equipment 2 or in response to a service S invocation message. It can also comprise at least one information item characterizing a functional capability of each of the DNS devices 8, such as, for example, a list of the methods, or of the records (RR) or even of the protocols supported by each of the DNS devices 8. As a variant, the control module 6B can act via another entity of the network for it to transmit such a DNS_RESOLVER header to the client equipment 2. In yet another variant, the control can be performed via the transmission of a dedicated option or a dedicated frame rather than a DNS_RESOLVER header. Yet other variants can be envisaged alternatively or in addition.

The functions of the modules 6A and 6B are described in more detail later with reference to the steps of the control method according to the invention.

When the computer 9 is or hosts a client equipment 2 conforming to the invention, the read-only memory 12 of the computer 9 then comprises a record of a computer program PROG2, comprising instructions defining the main steps of a transmission method according to the invention.

This program PROG2 defines functional modules of the client equipment 2 which rely on or control the hardware elements 10 to 14 of the computer 9 cited previously. These modules notably comprise, in the embodiment described here:

- a module 2A for storage of a DNS configuration, comprising the reachability information (e.g. IP address, domain name, alias, authentication identifier, etc.) of one or more DNS servers to be used for the resolution of domain names. The storage module 2A here comprises, following the connection of the client equipment 2 to the network AN, the reachability information, and more particularly the IP address, of the nominal DNS server 4 (or of one nominal DNS server in the case of a plurality of nominal DNS servers). As a variant, if the user U of the client equipment 2 has modified this configuration, the storage module 2A can comprise the reachability information of the public DNS server 5. In any case, the storage module 2A comprises the reachability information of the DNS server of the nominal DNS configuration, introduced previously;
- a modification module 2B, configured to modify, during access to the service S and under the control of the trusted entity 6, the DNS configuration of the client equipment 2 applied to resolve its DNS requests for the client equipment 2 to transmit to at least one DNS device 8, designated for the service S and authorized by the trusted entity 6, at least one domain name resolution request in the context of the service S. In the embodiment described here, the DNS configuration, including the rules for selection of the DNS requests affected and defined by the module 6B of the trusted entity 6 (in other words those associated with the service S) and the reachability information item or items of the DNS device or devices 8, is stored in a local cache 2D of the client equipment 2. Each entry of the cache 2D matches a DNS configuration to a given service and is associated here with a validity period: as long as the validity period of an entry has not expired, it is applied by the client equipment 2 for the service concerned, which is advantageous in the case of recurrent invocation of said service as illustrated later. It will be noted that the selection rules associated with each DNS configuration advantageously make it possible to distinguish the DNS configurations stored in the local cache 2D and which can concern several distinct services, and thus allow the client equipment 2 to apply, as a function of the service concerned, the right DNS configuration. As a variant, it is possible to envisage one local cache per service; and
- a transmission module 2C, configured to transmit at least one domain name resolution request in the context of the access to the service S (that is to say corresponding to the above-mentioned selection rules) to one of the DNS servers identified in the DNS configuration stored in the local cache 2D. Thus, before execution of the invention, the transmission module 2C is configured to transmit its DNS requests to the nominal DNS server 4 or to the public DNS server 5 according to the nominal DNS configuration adopted and stored in the storage module 2A; after execution of the control method according to the invention, the transmission module 2C is configured to transmit its DNS requests sent in the context of the access to the service S to one of the DNS devices 8 authorized by the trusted entity 6 and identified in the local cache 2D. In the embodiment described here, if several DNS devices 8 are authorized by the trusted entity 6 in the context of the access to the service S, the transmission module 2C is configured to obtain at least one information item characterizing a functional capability of each of the authorized DNS devices 8 (e.g. list of methods, of records RR or of protocols supported by each of the DNS devices 8) and to select one of them as a function of its functional capabilities. Such information on the functional capabilities of the DNS devices 8 can be stored in the DNS configuration stored in the local cache 2D. As a variant, other selection criteria can be envisaged, such as for example the location of the DNS server with respect to that of the client equipment 2, etc.

The functions of the modules 2A to 2C are described in more detail later with reference to the steps of the transmission method according to the invention.

There now follows a description, with reference to FIG. 3, of the main steps of a control method and of a transmission method according to the invention as they are implemented respectively by the trusted entity 6 and by the client equipment 2 of the system 1 in a particular embodiment.

In the example illustrated in FIG. 3, it is assumed that the entities of the system 1 and of the network use, to communicate with one another, a version of the HTTP protocol. However, this assumption is not limiting in itself. The invention is applied in combination with other protocols, such as, for example, the CoAP protocol, the QUIC protocol, etc.

Moreover, in the example envisaged in FIG. 3, the trusted entity 6 is the authoritative server 3.

As mentioned previously, it is assumed preliminarily that the client equipment 2 is configured to use the nominal DNS configuration introduced previously, in other words to transmit its domain name resolution requests or DNS requests to the nominal DNS server 4. In other words, the local cache 2D contains no alternative DNS configuration to the nominal DNS configuration to be applied in the context of the access to the service S.

Thus, when the client equipment 2 wants to access the service S, and set up in particular a connection with the authoritative server 3, it addresses, via its transmission module 2C, a DNS request designated QUERY(3), to its nominal DNS server 4 (step H10). The nominal DNS server 4 responds to it, in a manner known per se, by supplying an IP address, denoted @IP3, of the authoritative server 3 (step H20). In order to supply this response to it, it can notably contact recursive DNS servers if necessary.

After having set up a connection with the authoritative server 3 in a manner known per se (underlying connection to the service), for example via an exchange relying on the TCP and TLS protocols, the client equipment 2 then sends an HTTP POST request to access the service S to the authoritative server 3 by using as destination address the IP address @IP3 which was transmitted to it (step H30).

As mentioned previously, in the example considered here, the authoritative server 3 acts as trusted entity 6 according to the invention. It consequently comprises the modules 6A and 6B of the trusted entity 6 described previously.

Thus, on reception of the HTTP POST access request from the client equipment 2, the authoritative server 3 (acting as trusted entity 6) processes this request. It also consults its authorization module 6A to obtain the reachability information item or items (e.g. IP addresses here) of the DNS device or devices 8 authorized for the service S to resolve the DNS requests sent in the context of the access to the service S. It is assumed here that a number K greater than or equal to 1 of DNS devices 8 are affected. These K DNS devices are referenced respectively by DNS devices 8-1, 8-2 . . . 8-K hereinbelow.

The authoritative server 3 then inserts, via its control module 6B, in its HTTP response 200 OK to the HTTP POST access request received from the client equipment 2, the K IP addresses, @IP8-1 . . . , @IP8-K, of the K DNS devices 8 supplied by its authorization module 6A, an indication (explicit or implicit) that the client equipment 2 must send its future DNS requests sent in the context of the service S to at least one of said K DNS devices 8, and, here, the rules for selection of the DNS requests applying to these K DNS devices 8 (in other words, the rules which allow the client equipment 2 to recognize the DNS requests associated with the service S which must be addressed to these DNS devices 8). Then it transmits the HTTP response 200 OK to the client equipment 2 (step H40). In the embodiment described here, the addresses @IP8-1 . . . , @IP8-K are inserted by the control module 6B into the DNS_RESOLVER header which implicitly indicates to the client equipment 2 that it must send its future DNS requests sent in the context of the service S to at least one of the DNS devices 8 associated with one of the addresses @IP8-1 . . . , @IP8-K. The control module 6B also inserts into the DNS_RESOLVER header in association with each IP address, at least one information item characterizing at least one functional capability as described hereinabove of the DNS device 8 corresponding to this IP address (e.g. a list of protocols or of records RR or even of methods supported by each DNS device 8, or a combination of such lists). It can also insert into the DNS_RESOLVER header a validity period associated with the DNS configuration thus transmitted for the service S. It should however be noted that this validity period is optional and that, as a variant, it is possible to envisage the DNS configuration being applied at the client equipment 2 as long as it is not modified by the trusted entity 6.

The functional capabilities can, as a function of their nature, be inserted into different fields of the DNS_RESOLVER header. For example, the transport protocols supported by the DNS device 8 considered in a TRANSPORT_SET field, the records RR in an RR_SET field and the methods in a QUERY_SET field. Obviously, these names are given purely by way of illustration.

The insertion of the DNS_RESOLVER header in the HTTP response 200 OK to the HTTP POST request is a step of control, within the meaning of the invention, by the authoritative server 3 acting as trusted entity 6.

It will be noted that, in the example envisaged here, the DNS_RESOLVER header is inserted into a response to an HTTP POST access request to the service sent after the setting up of the underlying connection to the service S between the client equipment 2 and the authoritative server 3. It is however possible to envisage, as a variant, such an entity being inserted into a response to an HTTP POST request sent during the procedure of setting up the underlying connection to the service S. Such an HTTP POST request can for example be sent in a SYN and ClientHello TLS message if the TCP Fast Open and 0-RTT TLS mechanisms described respectively in the documents IETF RFC 7413 and RFC 8446 are activated.

In another variant, the indications previously cited, borne by the DNS_RESOLVER header, are inserted into a TCP and/or TLS option in response to a request to access the service or to a request to set up the underlying connection to the service S.

On reception of the HTTP response 200 OK from the authoritative server 3 and the detection of the DNS_RESOLVER header included in the response, the modification module 2B of the client equipment 2 modifies the DNS configuration applied by the client equipment 2 (which corresponds here to that which is stored in the storage module 2A in the absence of DNS configuration associated with the service S stored in the local cache 2D). More specifically, it stores in the local cache 2D the addresses @IP8-1, . . . , @IP8-K of the DNS devices 8 contained in the DNS_RESOLVER header to be used when accessing the service S and the selection rules allowing the client equipment 2 to identify the DNS requests affected by these DNS devices (step H50).

That way, the transmission module 2C of the client equipment 2 addresses the future DNS requests (QUERY (X)) sent in the context of the service S (for example, all the requests relating to the sub-domains «*.example.com» as a function of the selection rules defined by the trusted entity 6) to one of the DNS devices 8 identified in the new DNS configuration stored in the local cache 2D (and no longer to its nominal DNS server 4 as in the step H10, which can however continue to be solicited for DNS requests sent in the context of services other than the service S and not affected by the DNS configuration stored in the local cache 2D) (e.g. steps 60, H70).

It will be noted that these DNS requests can target a public domain name, but also a private domain name that the DNS devices 8 are adapted to resolve, or a domain name generated in the context of the service S for the client equipment 2, or an ephemeral domain name generated in the context of the service S, etc., or even a domain name bearing out several of these characteristics. By adapting the DNS configuration of the client equipment 2 as a function of the service S, a great degree of flexibility is offered to the provider of the service S in terms of DNS resolution.

Furthermore, it should also be noted that if, before the step H10, the local cache 2D already comprises a DNS configuration to be applied for the service S that is different from the nominal DNS configuration, and this DNS configuration is associated in the local cache 2D with an unexpired validity period, then, in the step H10, the client equipment 2 applies this DNS configuration stored in the local cache 2D and is addressed directly to one of the DNS devices 8 to resolve its DNS request. Said device supplies the address @IP3 of the authoritative server 3 in response to the DNS request sent by the client equipment 2 in the step H20. The steps H30 and H40 are maintained and make it possible, if necessary, to prolong the validity period of the DNS configuration already stored in the local cache 2D for the service S, or, if the DNS configuration applying to the service S has been modified by the trusted entity 6, to modify this DNS configuration.

As set out previously, if several DNS devices 8 are identified in the new DNS configuration stored by the local cache 2D, for each DNS request QUERY(X) having to be transmitted by the client equipment 2, the transmission module 2C selects one of the DNS devices 8 as a function of a given criterion. One such criterion is for example here the functional capabilities of the DNS devices 8.

Thus, by way of illustration, for K=2, let us assume that the DNS_RESOLVER header received by the client equipment 2 indicates a list of methods supported by each of the DNS devices 8-1, 8-2, and more particularly, for the DNS device 8-1, the HTTP (GET, POST, FETCH) methods, and for the DNS device 8-2, the HTTP (GET, POST) methods. Then, the transmission module 2C can select, without preference, the DNS device 8-1 or the device 8-2 for the sending of DNS GET and POST requests, and select the device 8-1 only for the sending of DNS FETCH requests.

According to another illustrative example, still for K=2, let us assume that the DNS_RESOLVER header received by the client equipment 2 indicates a list of records RR supported by each of the DNS devices 8-1, 8-2, and, more particularly for the DNS device 8-1, a record of SVCB («SerViCe Binding» type while for the DNS device 8-2, a record of MX («Mail eXchange») type. Then, the transmission module 2C selects the DNS device 8-1 to resolve the DNS requests relating to an SVCB record.

According to yet another illustrative example for K=2, let us assume that the DNS_RESOLVER header received by the client equipment 2 indicates a list of protocols supported by each of the DNS devices 8-1, 8-2, and, more particularly for the DNS device 8-1, the Do53 and DoQ protocols, while for the DNS device 8-2, the DoH (DNS over HTTPS) and DoC (DNS over CoAP) protocols, the DoT (DNS over TLS) protocol, the Do53, DoQ (DNS over QUIC), DoH and DoC protocols being known to the person skilled in the art and not detailed here. Then, the transmission module 2C supporting the DoH protocol can decide to select only the DNS device 8-1 to resolve its DNS requests.

As a variant, it is possible to envisage other criteria, such as for example a random selection, or a selection of a DNS device 8 as a function of its geographic proximity with respect to the client equipment 2, or even a combination of several criteria, etc.

In the example which has just been considered, the new DNS configuration to be applied is communicated by the authoritative server 3/the trusted entity 6 to the client equipment 2 in response to its request to access the service S. It should however be noted that this hypothesis is not limiting in itself and that the new configuration can be communicated to the client equipment 2 in response to any other service S invocation message, provided that it is sent while the client equipment 2 is accessing the service S. As a variant, the indication of applying the new DNS configuration can be transmitted by the authoritative server 3/the trusted entity 6 to the client equipment 2 asynchronously or spontaneously, that is to say without being linked with a particular service S invocation message sent by the client equipment 2.

Moreover, in the example which has just been described, the authoritative server 3/the trusted entity 6 itself indicates to the client equipment 2 the new DNS configuration to be applied for the service S, in other words the authoritative server 3/the trusted entity 6 directly modifies the DNS configuration applied by the client equipment 2 for the service S. As a variant, the modification at the client equipment 2 can be controlled (i.e. decided) by the trusted entity 6 but be put in place in the client equipment 2 by an intermediate entity. This intermediate entity can be any entity with which the trusted entity 6 maintains a trusted and/or secured relationship, such as, for example, an entity of the service infrastructure or a third-party entity placed notably on the path of the communications taken when the client equipment is accessing the service. It can even be one of the DNS devices that it has authorized for the service.

It should also be noted that, in the embodiment which has just been described, the authoritative server 3/the trusted entity 6 is a trusted entity 6 for the service, given that it is an entity of the infrastructure on which the service relies. It is however possible to envisage trusted entities other than the entities of the service infrastructure, such as for example an entity designated by the provider of the service or of another infrastructure with which the provider of the service has established an agreement relying on a trusted relationship.

It is also possible to envisage applying the invention in a context in which the trusted entity which controls the DNS configuration used by the client equipment 2 when it accesses the service S is a trusted entity for the client equipment 2. For example, it can be an intermediate equipment via which the client equipment 2 sets up a connection with the Internet network to access the service S and with which it has itself set up a secured connection (for example encrypted, or a secured communication tunnel) such that all the messages sent and received by the client equipment 2 when accessing the service S transit through this intermediate equipment. Such an intermediate equipment can, by way of illustration, be an equipment of CPE (for «Customer Premises Equipment») type, or a relay or proxy located in the interface Gi of a mobile network, etc. It is then possible to envisage it being configured with a list of rules allowing it to select the appropriate DNS devices for a given service. This list of rules can originate from measurements performed by the intermediate equipment concerned or by another equipment allowing the intermediate equipment to classify the DNS devices as a function for example of their availability or of their performance levels.

Several cases of use of the invention will now be detailed by way of illustration. These different cases of use guide or impact the choice of DNS devices towards which the DNS requests from the client equipment are oriented during its access to the service.

According to a first case of use, there are designated, as DNS devices for the service S, devices of the network NW via which connections set up by the client equipment in the context of the service S are wanted to transit. These connections can comprise the main connection set up by the client equipment with the authoritative server to access the service, but also all the secondary connections set up at the margin of this main connection, sometimes without the knowledge of the user of the client equipment. The DNS devices thus designated can thus resolve each DNS request sent by the client equipment 2 by supplying their own IP addresses so as to receive each data packet sent by the client equipment over the main and secondary connections. On reception of these data packets, they can thus put in place various processing operations, such as for example the analysis of the content of these packets to determine whether they contain user identification information, or other information that they want to track. The DNS devices can also, as a variant, resolve each request sent by the client equipment by supplying the IP address of another trusted equipment responsible for such processing operations. This case of use makes it possible to place given equipments on the path of the main and secondary connections set up by the client equipment in the context of the service S.

According to a second case of use, there are designated, as DNS devices for the service S, DNS devices which have been configured to resolve, among other things, domain name requests relating to private and/or personalized and/or even ephemeral domain names, generated in the context of the service S, for example by the service provider. These domain names are deliberately kept secret and remain unknown from the public or nominal DNS servers configured by the network operators. This second case of use can be adopted as security measure to prevent denial-of-service attacks for example. It also allows the service provider to envisage domain names that can be personalized, and for example generate domain names personalized as a function of the identity of the user of the client equipment, or ephemeral domain names. The recourse to DNS devices specific to the service makes it possible to facilitate the addition and/or the removal of such domain names and avoid the latency induced by such an approach with a public/nominal DNS server.

According to a third case of use, it is possible to envisage designating, as DNS devices for the service S, DNS devices which have been configured to perform a personalized resolution of the DNS requests addressed by a client equipment, for example in the interests of observance of the service constraints. For example, such a DNS device can return to a client equipment an IP address for a domain name and situated in proximity to the client equipment (e.g. having a delay less than «x ms»).

According to a fourth case of use, it is possible to envisage designating, as DNS devices for the service S. DNS devices which implement advanced DNS functions, which are not implemented by public or nominal DNS servers provided by the network operators (for example which supports the DoC protocol, as described in the document by M. S. Lenders entitled «DNS Queries over CoAP (DoC), draft-lenders-dns-over-cap-01», Sep. 1, 2021).

Obviously, other cases of use of the invention can be envisaged in addition to those which have just been cited.

The invention claimed is:

1. A control method for controlling a client equipment to access a service via at least one network, said control method being implemented by a trusted entity for said service and/or for said client equipment and comprising:

during an access by the client equipment to said service, controlling a configuration of said client equipment relative to at least one domain name resolution server to be used by the client equipment, for the client equipment to transmit to at least one device designated for said service and authorized by said trusted entity, at least one domain name resolution request sent by said client equipment in a context of said service.

2. The control method as claimed in claim 1, wherein said trusted entity is a server involved in a provision of said service.

3. The control method as claimed in claim 1, wherein said trusted entity is an intermediate entity placed on a communication path taken when said client equipment accesses said service.

4. The control method as claimed in claim 1, wherein the controlling of the configuration of said client equipment comprises transmitting by the trusted entity to said client equipment a message comprising at least one reachability information item of at least one said device designated for said service and authorized by said trusted entity.

5. The control method as claimed in claim 4, wherein said message is a response message to a message of invocation of said service sent by said client equipment or a message sent asynchronously by said trusted entity.

6. The control method as claimed in claim 4, wherein said at least one reachability information item is included in a header, an option, a frame, an attribute, or a payload of the message.

7. The control method as claimed in claim 4, wherein said message conforms to a version of an HTTP (HyperText Transfer Protocol) protocol or of a CoAP (Constrained Application Protocol) protocol or of a QUIC protocol.

8. The control method as claimed in claim 4, wherein said message comprises, for at least one said device designated for said service and authorized by said trusted entity, at least one information item characterizing at least one functional capability of said at least one said device.

9. The control method as claimed in claim 1, wherein at least one said domain name resolution request concerns:

a private domain name; and/or a domain name generated in the context of said service for said client equipment; and/or an ephemeral domain name.

10. A method for transmitting at least one domain name resolution request implemented by a client equipment in a context of a service provided via a network, said method comprising:

during an access to said service and under a control of a trusted entity for said service and/or said client equipment, modifying a configuration of the client equipment relative to at least one domain name resolution server to be used by the client equipment, for the client equipment to transmit to at least one device designated for a processing of domain name resolution requests associated with the service and authorized by said trusted entity, at least one domain name resolution request sent by said client equipment in the context of said service; and transmitting at least one domain name resolution request in the context of said service to at least one said designated device.

11. A non-transitory storage medium that can be read by a computer on which is stored a computer program comprising instructions for executing a method for controlling a client equipment to access a service via at least one network, when said computer program is run by a computer of a trusted entity for said service and/or for said client equipment, the method of controlling comprising:

during an access by the client equipment to said service, controlling a configuration of said client equipment relative to at least one domain name resolution server to be used by the client equipment, for the client equipment to transmit to at least one device designated for said service and authorized by said trusted entity, at least one domain name resolution request sent by said client equipment in a context of said service.

12. A trusted entity for a service and/or for a client equipment of a network, said trusted entity comprising:

at least one processor; and at least one non-transitory computer readable medium comprising instructions stored thereon which when executed by the at least one processor configure the trusted entity to:

during an access by the client equipment to the service, control a configuration of said client equipment relative to at least one domain name resolution server to be used by the client equipment, for the client equipment to transmit to at least one device designated for said service and authorized by said trusted entity, at least one domain name resolution request sent by said client equipment in a context of said service.

13. A client equipment of a network, the client equipment comprising:

at least one processor; and at least one non-transitory computer readable medium comprising instructions stored thereon which when executed by the at least one processor configure the client equipment to:

during an access to a service provided via the network and under a control of a trusted entity for said service and/or said client equipment, modify a configuration of the client equipment relative to at least one domain name resolution server to be used by the client equipment, for the client equipment to transmit to at least one device designated for a processing of domain name resolution requests associated with the service and authorized by said trusted entity, at least one domain name resolution request sent by said client equipment in a context of said service; and transmit at least one domain name resolution request in the context of said service to at least one said designated device.

14. The client equipment as claimed in claim 13, wherein the instructions further configure the client equipment to obtain, for at least one said designated device, an information item characterizing at least one functional capability of this at least one said designated device, and to transmit said at least one domain name resolution request to one of said at least one said designated device selected as a function of said at least one functional capability of this device.

15. A non-transitory storage medium that can be read by a computer on which is stored a computer program comprising instructions for executing a method for transmitting at least one domain name resolution request, when said computer program is run by a computer of a client equipment in the context of a service provided via a network, the method of transmitting comprising:

during an access to said service and under a control of a trusted entity for said service and/or said client equipment, modifying a configuration of the client equipment relative to at least one domain name resolution server to be used by the client equipment, for the client equipment to transmit to at least one device designated for a processing of domain name resolution requests associated with the service and authorized by said trusted entity, at least one domain name resolution request sent by said client equipment in the context of said service; and transmitting at least one domain name resolution request in the context of said service to at least one said designated device.

* * * * *